United States Patent [19]

Ginier

[11] Patent Number: 4,788,476
[45] Date of Patent: Nov. 29, 1988

[54] MACHINE FOR LAPPING TWO CURVED-TOOTH BEVEL GEARS

[75] Inventor: Ami Ginier, Bergdietikon, Switzerland

[73] Assignee: Werkzeugmaschinenfabrik Oerlikon-Bührle AG, Zürich, Switzerland

[21] Appl. No.: 102,158

[22] Filed: Sep. 28, 1987

[30] Foreign Application Priority Data

Oct. 3, 1986 [CH] Switzerland ............ 3950/86

[51] Int. Cl.$^4$ ............ H02P 7/67; B24B 37/00
[52] U.S. Cl. ............ 318/41; 318/45; 318/77; 318/98; 51/26; 51/165 R
[58] Field of Search ............ 318/41, 45, 46, 47, 318/48, 77, 85, 98, 99; 51/26, 105 G, 109 R, 120, 123 R, 131.1, 131.2, 131.3, 131.4, 132, 133, 165 R, 287, DIG. 1, DIG. 3; 125/12 DF; 144/28.6; 409/13, 28, 31, 37

[56] References Cited

U.S. PATENT DOCUMENTS

| | | | |
|---|---|---|---|
| 3,717,958 | 2/1973 | Ellwanger et al. | 51/26 |
| 3,724,042 | 4/1973 | Raess et al. | 29/90.6 |
| 3,807,094 | 4/1974 | Ellwanger et al. | 51/26 |
| 3,994,098 | 11/1976 | Konersmann et al. | 409/31 X |
| 4,308,489 | 12/1981 | Bergmann | 318/77 |
| 4,433,510 | 2/1984 | Katagiri et al. | 318/607 X |
| 4,635,404 | 1/1987 | Wirz | 51/287 X |
| 4,638,221 | 1/1987 | Brignall | 318/48 |

FOREIGN PATENT DOCUMENTS

0714612 2/1980 U.S.S.R. ............ 318/47
0884896 11/1981 U.S.S.R. ............ 409/13

*Primary Examiner*—Bentsu Ro
*Attorney, Agent, or Firm*—Werner W. Kleeman

[57] ABSTRACT

A lapping machine for correcting the asymmetrical hardening distortions which occur during the hardening of gear wheels, especially bevel gears, is disclosed. This machine is particularly advantageous in connection with large bevel gear transmissions or drives produced in small batches. This is achieved by selective lapping, in that both bevel gears are each driven by a respective separate speed-regulated electric motor. An electronic transmission or drive, also referred to as an electric shaft, controls and regulates one electric motor to serve as the master motor and the other to serve as the slave motor as a function of the rotational speed of the master motor and the gear ratio of the two bevel gears. A device serves for controlling and regulating a selectable relative lapping torque.

6 Claims, 4 Drawing Sheets

MACHINE FOR LAPPING TWO CURVED-TOOTH BEVEL GEARS

BACKGROUND OF THE INVENTION

The present invention broadly relates to a new and improved construction of a lapping machine for lapping gears or gear wheels, especially two curved-tooth bevel gears or the like.

Generally speaking, the lapping machine for lapping two curved-tooth bevel gears or gear wheels is of the type comprising a speed-regulated electric motor for driving one of the two bevel gears.

Such type of lapping machines used for lapping a bevel gear or hypoid pair are known, for example, from Swiss Pat. No. 530,845, which is cognate to U.S. Pat. No. 3,724,042, granted Apr. 3, 1973 and Swiss Pat. No. 580,461, which is cognate to U.S. Pat. No. 3,994,098, granted Nov. 30, 1976, contain a device for driving one bevel gear and for braking the other bevel gear, as well as a control device for setting the desired lapping pressure. During the lapping operation or process, the two rotating spindles or shafts, at each of which there is mounted a respective one of the two bevel gears, are so moved with respect to one another that in the case of crown or localized-bearing teeth, the lapping contact migrates over the tooth flanks. The lapping machines are equipped with additional means in order to produce and control additional or supplementary movements in the defined directions V, H and J. Apart from the aforementioned lapping movements, the lapping pressure is a very important parameter. The corresponding rolling pressure is produced by the brake drive in both rotation directions (the correspondingly effective push tooth flank and pull tooth flank). In the known lapping machines, the so-called rolling pressure has the same value on all tooth flanks (that is, for example, 0.05 Newton/mm$^2$) This property is particularly disadvantageous if there is present an asymmetrical hardening distortion by virtue of the hardening of the individual gears. As the parameters H and V are defined by the gear tooth with the greatest hardening distortion, subsequently, all the tooth flanks are lapped in the same way.

SUMMARY OF THE INVENTION

Therefore, with the foregoing in mind, it is a primary object of the present invention to provide a new and improved construction of a lapping machine for lapping gears or gear wheels, especially curved-tooth bevel gears, in a manner which is not afflicted with the aforementioned drawbacks and shortcomings of the prior art constructions.

Another and more specific object of the present invention aims at the provision of a new and improved construction of a lapping machine for lapping bevel gears, wherein the lapping machine of the present development permits during lapping correction of the asymmetrical hardening distortions which occurred during the hardening of such bevel gears.

A further significant object of the present invention is to provide a new and improved construction of a lapping machine for lapping gears or gear wheels such that the gear teeth of such gears or gear wheels can undergo selective lapping as a function of predeterminate properties, especially the hardness or hardness distortion of the gear teeth thereof.

Yet another noteworthy object of the present invention is to provide a new and improved construction of a lapping machine for lapping curved-tooth bevel gears and which lapping machine is relatively simple in construction and design, highly reliable in operation, quite economical to manufacture, not readily subject to breakdown or malfunction and requires a minimum of maintenance and servicing.

Now in order to implement these and still further objects of the invention, which will become more readily apparent as the description proceeds, the lapping machine for lapping gear wheels, especially two curved-tooth bevel gears having a predeterminate gear ratio, is manifested by the features that there is provided a speed-regulated electric motor for driving one of the two bevel gears and a position and speed-regulated electric motor for driving the other bevel gear of the two bevel gears. An electronic transmission is operatively connected to both the speed-regulated electric motor for driving the one bevel gear and to the position and speed-regulated electric motor for driving the other bevel gear. The speed-regulated electric motor serves as a master motor and the position and speed-regulated electric motor serves as a slave motor. The electronic transmission is structured such that it causes the slave motor to synchronously follow the master motor as a function of the rotational speed of the master motor and the predeterminate gear ratio of the two bevel gears. Also there is provided a device or means which cooperates with the electronic transmission for controlling and regulating a selectable relative lapping torque for selective lapping of the gear teeth of the two bevel gears.

Certain of the more notable advantages which can be realized with the present invention reside in the fact that a varyingly marked or pronounced removal of material from the gear teeth can be brought about by selective lapping of the individual tooth flanks. Particularly in the case of large crown gears produced in small batches or series, in which such asymmetrical hardening distortions occur to an increasing extent, the inventive selective lapping machine permits an economic correction treatment or processing of such gears or gear wheels.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Figure 1:
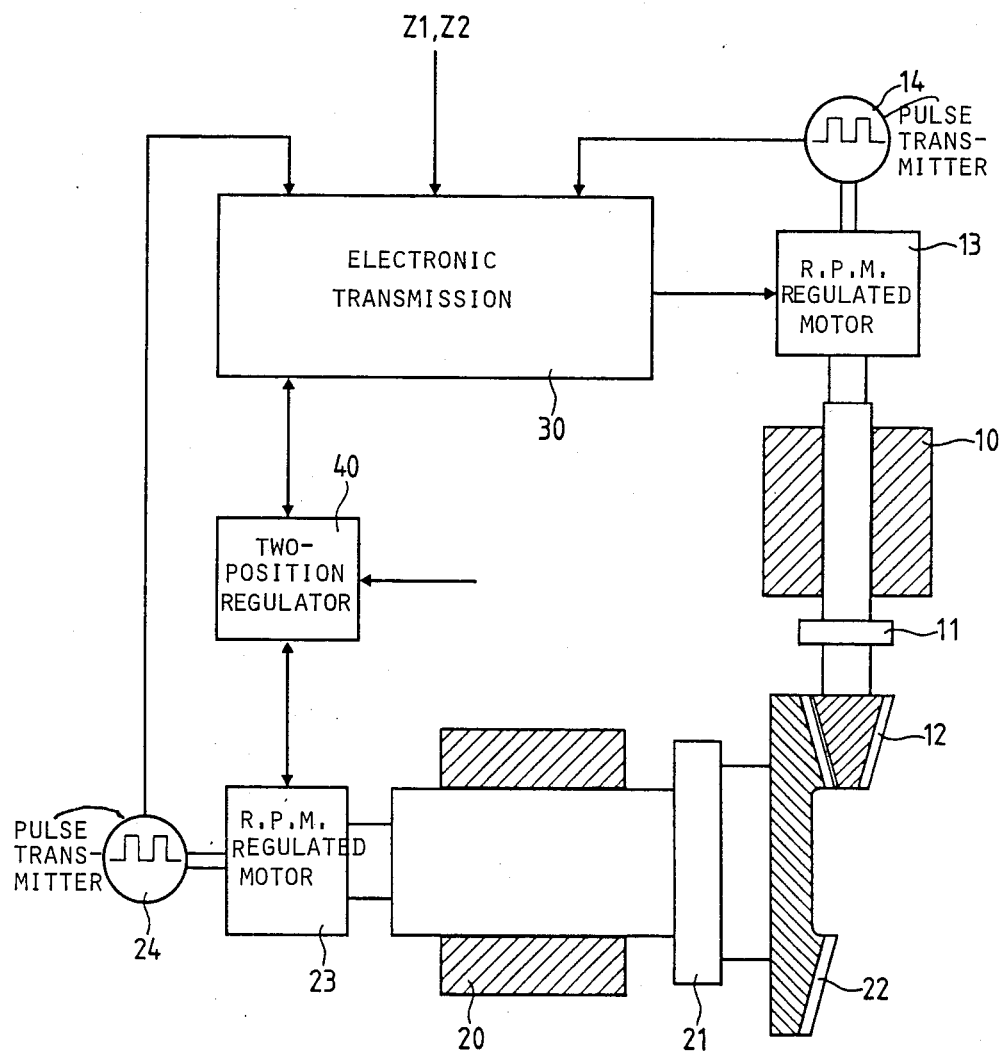
FIG. 1 shows a diagrammatic representation of the inventive drive system for a lapping machine.

Describing now the drawings, it is to be understood that to simplify the showing thereof, only enough of the structure of the lapping machine for lapping gears or gear wheels, especially bevel gears or the like has been illustrated therein as is needed to enable one skilled in the art to readily understand the underlying principles and concepts of the present invention. Turning now specifically to FIG. 1 of the drawings, the lapping machine illustrated therein by way of example and not limitation, will be seen to comprise two spindle headstocks or heads 10 and 20 or equivalent structure equipped with spindles or shafts 11 and 21 rotatably arranged in each associated spindle headstock 10 and 20, respectively. In each case, one of the two bevel gears 12 and 22 to be lapped, is mounted on a related one of the two spindles or shafts 11 and 21. The lapping operation or process as such, with the additional movements of the spindles or shafts 11 and 21 or spindle headstocks 10 and 20 to be carried-out, is known, for example, from the aforementioned Swiss Pat. No. 530,845 and its cognate U.S. Pat. No. 3,724,042, granted Apr. 3, 1973, to which reference may be readily had and the disclosure of which is incorporated herein by reference, and thus will not be further explained hereinafter.

According to the present development, the two spindles 11 and 21 are, in each case, driven by a separate operatively associated speed-regulated electric motor 13 and 23. Through an electronic transmission or drive, also referred to as an electric shaft 30, the two electric motors 13 and 23 are interconnected in time-dependent and synchronous manner. One of the two electric motors 13 and 23, in the present case, the electric motor 13, is constructed as the master or lead motor and the other electric motor 23 as the slave or follower motor. In the arrangement of FIG. 1, a subordinate, additional or supplementary torque regulator 40 is shown positioned between the electronic transmission or electric shaft 30 and the slave or follower motor 23. A respective pulse transmitter 14 and 24 transmits the precise angular position of the associated spindle or shaft 11 and 21, respectively, in other words the angular position of the electric motor shaft of the related or associated speed-regulated electric motor 13 and 23, as the case may be.

It is well known from other technologies to mutually synchronously interconnect two electric motors by means of an electric control system or an electronic transmission (cf. Swiss Pat. No. 582,038, granted Nov. 30, 1976). Thus, the present electronic transmission or electric shaft 30 is constructed in known manner and, in addition to the structure and functions represented in FIG. 2, contains further, not described structure and functions, such as a control panel with display screen and operating or function keys, a numerically controlled system together with inputs and outputs for the lapping machine, and so forth. Since such further structure and related functions are not important to the appreciation and understanding of the teachings and principles of the present invention, they thus will not be here further considered.

Figure 2:
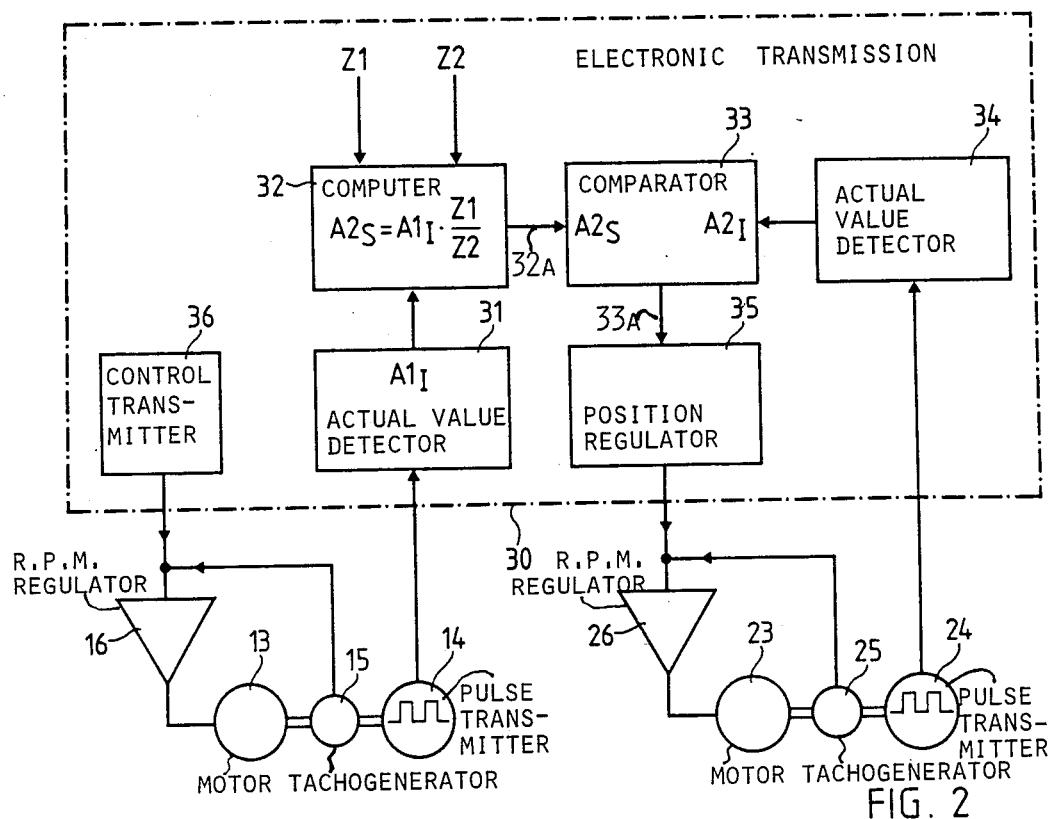
FIG. 2 shows a diagrammatic representation of an electronic transmission or electric shaft used in the drive system for the lapping machine depicted in FIG. 1.

According to the showing of FIG. 2, each of the two electric motors 13 and 23 has operatively associated therewith, a respective tachogenerator 15 and 25 and a respective rotational speed regulator 16 and 26. The electronic transmission or electric shaft 30, illustrated by the dot-dash line in such FIG. 2, contains the following structural or functional elements: a first actual value detector or determinator 31, a computer 32, a comparator 33, a second actual value detector or determinator 34, a position regulator 35 and a control or guide transmitter 36. The actual value detector 31 is connected, on the one hand, to the pulse transmitter 14 of the master or lead motor 13 and, on the other hand, to the computer 32. The computer 32 has inputs Z1 and Z2 as well as an output/32A connected to the comparator 33. The pulse transmitter 24 of the slave or follower motor 23 is connected by means of the second actual value detector 34 to the comparator 33. The output signal appearing at the output 33A of the comparator 33 is delivered directly via the position regulator 35 according to FIG. 2 or indirectly via the torque regulator 40 of the slave or follower motor 23 according to the arrangement depicted in FIG. 1. The speed regulator 16 of the master or lead motor 13 is connected to the control or guide transmitter 36.

Figure 3:
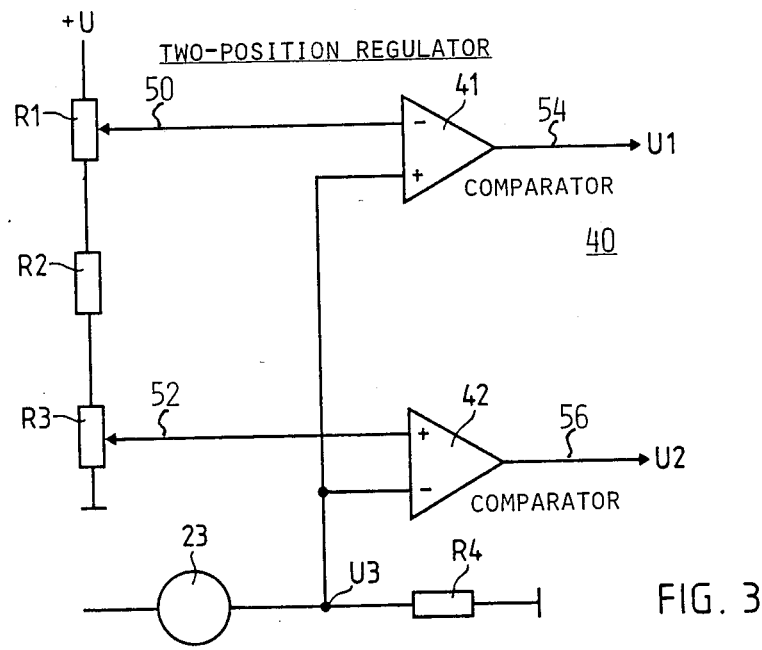
FIG. 3 shows a diagrammatic representation of a two-position regulator or controller.

FIG. 3 shows in greater detail, a torque regulator 40 constructed as a two-position regulator or controller. A resistor R4 serving for current determination or detection purposes, is placed in the circuit of the slave or follower motor 23. The voltage U3 appearing across the resistor R4 is supplied to the non-inverting input of a comparator 41 and the inverting input of a comparator 42. Two adjustable potentiometers R1 and R3 and an interposed resistor R2 are connected in series to a constant voltage or voltage supply $+U$. The tap 50 of the potentiometer R1 which is at the higher potential is connected to the inverting input of the comparator 41 and the tap 52 of the potentiometer R3 is connected to the non-inverting input of the comparator 42. The two output signals U1 and U2 appearing at the respective outputs 54 and 56 of the two comparators 41 and 42 are supplied to the control circuit of the electronic transmission or electric shaft 30. A maximum relative lapping torque is set at the potentiometer R1 and a minimum relative lapping torque at the potentiometer R3. Obviously, the subordinate two-position regulator or controller 40 can be integrated into the circuits of the electronic transmission or electric shaft 30 and the speed regulator 26, for instance, according to FIG. 2.

The diagrams of FIGS. 4a to 4d and 5a to 5d will now be explained in connection with the mode of operation of the previously described lapping machine and associated structure.

DESCRIPTION OF THE MODE OF OPERATION

In order that a selective lapping operation or process can be initiated, the teeth of one gear, in this case, the pinion 12, must be positioned in the tooth gaps or spaces of the second or other gear, in this case, the crown gear or wheel 22. Such centering processes are well known in the art and will not therefore be explained further hereinafter. From this centering position, i.e. with the pinion 12 and the crown gear or wheel 22 in mesh with one another and undergoing rotational movement, the slave or follower motor 23 and therefore the crown gear 22 are numerically controlled to perform an additional or supplementary rotational speed until the teeth with the maximum hardening distortion come into contact. As a consequence of the selective lapping contact with the gear tooth having the greatest hardness distortion, there is thus removed material by the thus undertaken selective lapping operation. As soon as the torque configuration or pattern measured at the resistor R4 has reached a maximum value max set at the potentiometer R1, (cf. FIGS. 4a and 5a), the comparator 41 supplies a signal U1 to the circuit of the electronic transmission or electric shaft 30 and therefore stops the application of the additional rotational speed or torque and thus terminates the selective lapping operation for the relevant gear tooth which had the greatest hardening distortion. The rotating meshing pinion 12 and the crown gear or wheel 22 now rotate synchronously with the same tangential speed.

The possibility exists with the represented arrangement according to FIGS. 1 and 2, to electronically very accurately couple the spindle or shaft 21 as the slave or follow-up spindle with the spindle or shaft 11 as the master or lead spindle. The regulation or control magnitude or quantity is constituted by the pulses generated at the pulse transmitter 14 of the master or lead motor 13, which represent the traversed angle $A1_I$ of the master or lead spindle or shaft 11. These pulses are detected and processed in the first actual value detector 31 and are then supplied to the subsequently connected or following arranged computer 32. The reference or set value speed of the master or lead motor 13 is delivered or inputted by the control or guide transmitter 36 into the speed regulator 16. Together with the input data Z1, i.e. the number of teeth of the pinion 12, and Z2, i.e. the number of teeth of the crown gear or wheel 22, as well as the actual value $A1_I$, the reference or desired rotation angle $A2_S$ of the slave or follower motor 23 is cyclically calculated in the computer 32 according to the following formula:

$$A2_S = A1_I \frac{Z1}{Z2}$$

The highly accurately and rapidly determined reference or desired rotation angle $A2_S$ is compared in the comparator 33 with the actual rotation or rotational angle $A2_I$ of the slave or follower motor 23 supplied by the pulse transmitter 24 and detected and processed in the second actual value detector 34. The difference, called the "drag distance", is supplied to the position regulator 35 and processed. In order to obtain a coupling rigidity, the transmission behavior of the position regulator 35 is influenced in such a way by an adaptive servo-control, that during the lapping operation, the drag distance assumes a minimum value. The output of the position regulator 35 is then supplied to the speed regulator 26 of the slave or follower motor 23.

Figure 4A:
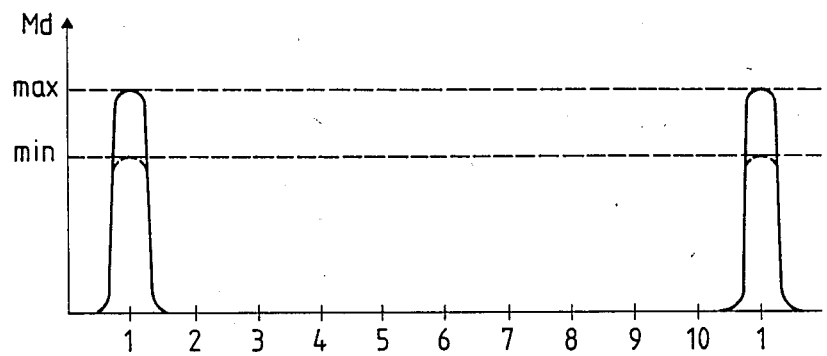
FIGS. 4a through 4d show diagrams of the relative torque configuration or pattern during selective lapping, wherein strictly for explanatory purposes, the bevel gears undergoing lapping are assumed to each possess ten gear teeth.
Figure 4B:
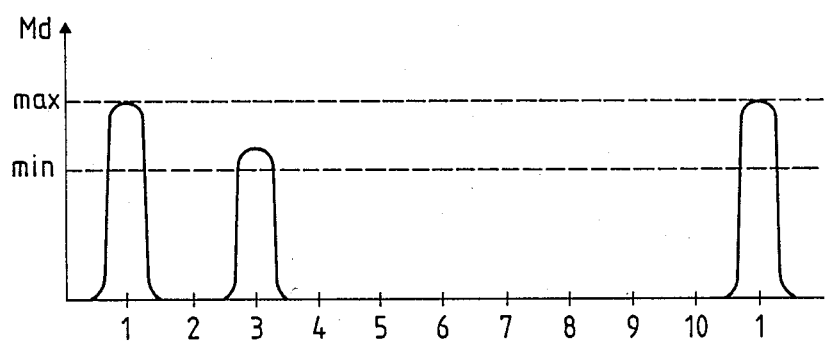
Figure 4C:
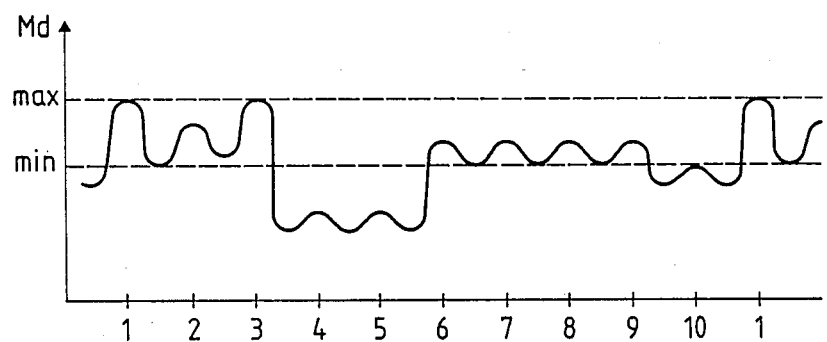
Figure 4D:
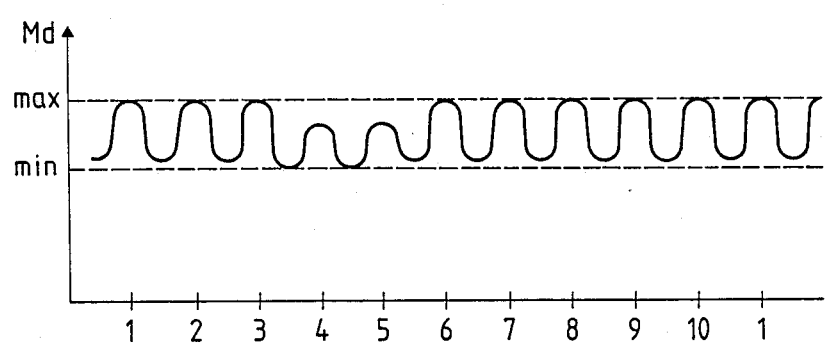
Figure 5A:
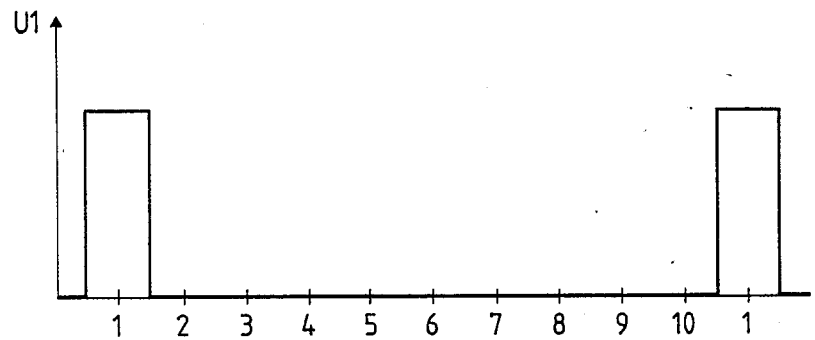
FIGS. 5d through 5d show diagrams of the output signals of the two-position regulator or controller related to FIGS. 4a, 4c and 4d.
Figure 5B:
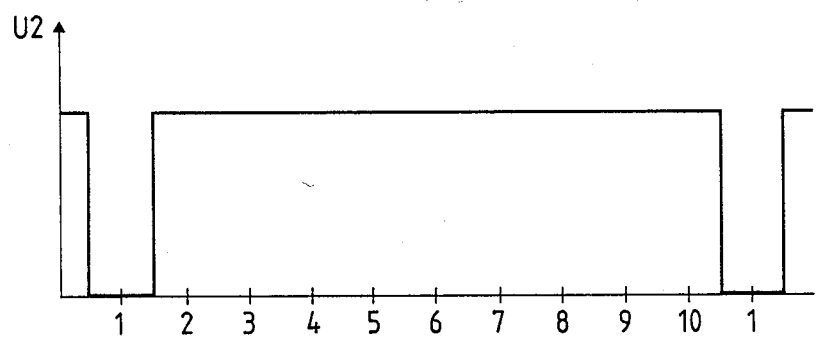

The torque configuration or pattern during selective lapping is shown in FIGS. 4a through 4d and the diagrams of the output signals U1 and U2 of the comparators 41 and 42, i.e. the two-position regulator or controller 40 are shown for selective lapping in FIGS. 5a through 5d. According to FIG. 4a, a lapping torque Md acts on the tooth No. 1 of a crown gear or wheel 22 having ten teeth, because such tooth No. 1 has the maximum hardening distortion. FIG. 5a shows the output or output signal U1 appearing at the output 54 of the comparator 41 for the selective lapping of this tooth No. 1. As explained hereinbefore, an additional torque (rotational speed) is produced at the slave drive motor 23 in order to remove by the selective lapping operation, material from the gear tooth No. 1. If the relative lapping pressure reaches the maximum value max set on the potentiometer R1 (cf. FIG. 4a), a signal U1 appears which, as stated hereinbefore, brings about the disconnection or elimination of the additional rotational speed or torque. FIG. 5b shows the signal diagram at the output 56 of the comparator 42 during the selective lapping of the tooth No. 1. No signal appears at the output 56 of the comparator 42 for the tooth No. 1 because the relative lapping torque is larger than the minimum value min set at the potentiometer R3, (cf. FIG. 4a). For the teeth Nos. 2 through 10, a signal appears at the output 56 of the comparator 42 because the relative lapping torque for such teeth Nos. 2 through 10 is smaller than the set minimum value. However, this signal constellation or pattern has no influence on the circuit of the electronic transmission or electric shaft 30. If, as a result of the lapping effect, there is a drop below the set minimum value on the tooth No. 1, then, a positive signal is also supplied for the tooth No. 1 at the output 56 of the comparator 42 so that within one revolution of the crown gear or wheel 22, a positive signal is supplied for all the teeth or, in other words, the signal no longer drops to zero for any of the teeth. An additional rotational speed or torque for the slave or follower motor 23 is now introduced into the circuit of the electronic transmission or electric shaft 30 or in its evaluation electronics. This additional rotational movement or torque is then again disconnected or eliminated by the comparator 41 when the relative lapping torque on one or more of the teeth exceeds the set maximum value. According to FIG. 4b, it is then possible to work the teeth Nos. 1 and 3 by selective lapping.

Figure 5C:
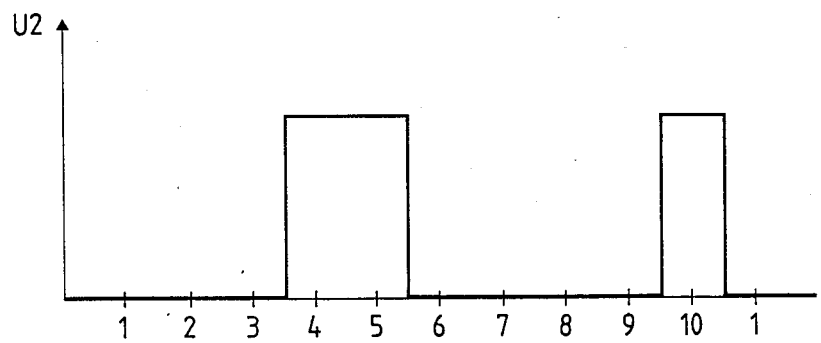
Figure 5D:
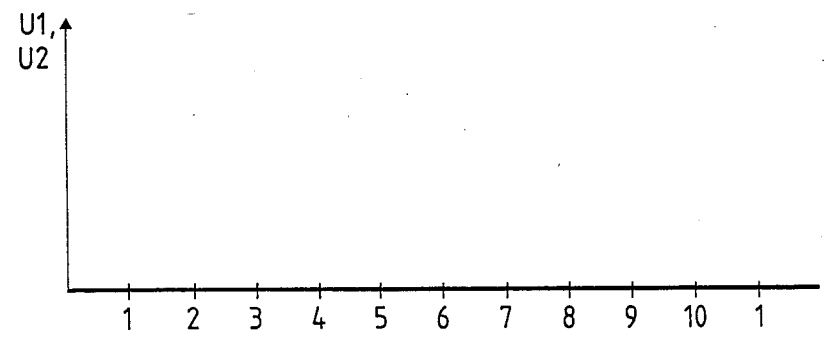

The aforedescribed selective lapping operation on the gear teeth Nos. 1 and 3 is continued until the lapping torque indicated by the two-point regulator or controller 40 shown in FIG. 3 decreases to the predetermined maximum value. As a result, there may be obtained, as an example, a situation as illustrated in FIGS. 4c and 5c and in which situation, the lapping torque at gear teeth Nos. 4, 5 and 10 is still below the minimum level predetermined by the two-point regulator or controller 40 shown in FIG. 3.

Only when all the gear teeth have been worked in the same selective lapping process, is the selective lapping process automatically terminated or ended. FIG. 4d shows that the torque configuration or pattern measured across the resistor R4 indicates that all the gear teeth have now been properly detected by the lapping process. If the lapping torque for all the gear teeth is within the two set limits or boundaries max and min, then at the outputs 54 and 56 of both comparators 41 and 42, respectively, there appears the signal zero or null for all the gear teeth (cf. FIG. 5d). Thus, the evaluation electronics are informed that the lapping process or operation can be terminated.

As a result of this selective lapping of tooth flanks on curved-tooth bevel gears, an improvement in the tooth surfaces and running qualities is achieved. Concentricity errors are largely eliminated and single-tooth contact is greatly improved. Both the power transmission capacity or capability and the quiet running of the gears or gear wheels are improved.

While there are shown and described present preferred embodiments of the invention, it is to be distinctly understood that the invention is not limited thereto, but may be otherwise variously embodied and practiced within the scope of the following claims. Accordingly,

What I claim is:

1. A machine for lapping bevel gears, especially two curved-tooth bevel gears having a predeterminate gear ratio, comprising:

a speed-regulated electric motor for driving one of the two bevel gears;

a position and speed-regulated electric motor for driving the other bevel gear of the two bevel gears;

an electronic transmission operatively connected to said speed-regulated electric motor for driving said one of the two bevel gears and to said position and speed-regulated electric motor for driving said other bevel gear;

said speed-regulated electric motor serving as a master motor;

said position and speed-regulated electric motor serving as a slave motor;

said electronic transmission containing means for causing said slave motor to synchronously follow said master motor as a function of the rotational speed of the master motor and the predeterminate gear ratio of the two bevel gears; and means cooperating with said electronic transmission for controlling and regulating a selectable relative lapping torque for selective lapping of the gear teeth of the two bevel gears.

2. The machine as defined in claim 1, wherein:

said means for controlling and regulating said selectable relative lapping torque for selective lapping of the gear teeth of the two bevel gears comprising a two-position regulator for regulating between two selectable limit values said selectable relative lapping torque for said selective lapping of the gear teeth of the two bevel gears.

3. The machine as defined in claim 2, wherein:

said two-position regulator contains means for setting the two limit values for the relative lapping torque.

4. The machine as defined in claim 3, wherein:

said means for setting the two limit values for the relative lapping torque comprises adjustable potentiometers.

5. The machine as defined in claim 2, wherein:

said two-position regulator contains output means for delivering output signals for automatically terminating selective lapping of the gear teeth of the bevel gears.

6. A machine for lapping two gear wheels having a predeterminate gear ratio, especially bevel gears, comprising:

a first electric motor for driving one of the two gear wheels;

means for speed regulating said first electric motor;

a second electric motor for driving the other gear wheel of the two gear wheels;

means for speed regulating said second electric motor;

means defining an electric shaft means operatively connected to said speed-regulated first electric motor for driving said one of the two gear wheels and to said speed-regulated second electric motor for driving said other gear wheel;

said speed-regulated first electric motor serving as a master motor;

said speed-regulated second electric motor serving as a slave motor;

said means defining said electric shaft means containing means for causing said slave motor to essentially synchronously follow said master motor as a function of the rotational speed of the master motor and the predeterminate gear ratio of the two gear wheels; and means operatively coacting with said electric shaft means for controlling and regulating a selectable relative lapping torque for selective lapping of the gear teeth of the two gear wheels.

* * * * *